(12) United States Patent
Smyth

(10) Patent No.: US 8,627,814 B2
(45) Date of Patent: Jan. 14, 2014

(54) SOLAR WATER HEATER

(75) Inventor: Mervyn Smyth, Belfast (GB)

(73) Assignee: University of Ulster, Londonderry (GB)

( * ) Notice: Subject to any disclaimer, the term of this patent is extended or adjusted under 35 U.S.C. 154(b) by 186 days.

(21) Appl. No.: 13/128,218

(22) PCT Filed: Nov. 6, 2009

(86) PCT No.: PCT/EP2009/007961
§ 371 (c)(1),
(2), (4) Date: Jul. 25, 2011

(87) PCT Pub. No.: WO2010/052010
PCT Pub. Date: May 14, 2010

(65) Prior Publication Data
US 2011/0277746 A1    Nov. 17, 2011

(30) Foreign Application Priority Data
Nov. 7, 2008 (GB) .................................. 0820369.7

(51) Int. Cl.
*F24J 2/04* (2006.01)

(52) U.S. Cl.
USPC ............................ 126/618; 126/642; 126/705

(58) Field of Classification Search
USPC .............. 126/618, 642, 705, 634; 165/10, 46, 165/104.11
See application file for complete search history.

(56) References Cited

U.S. PATENT DOCUMENTS 4,250,958 A * 2/1981 Wasserman ..................... 165/46

* cited by examiner

*Primary Examiner* — Alfred Basichas
(74) *Attorney, Agent, or Firm* — Perkins Coie LLP

(57) ABSTRACT

The present invention provides a solar water heating apparatus which includes concentric inner and outer vessels defining an annular cavity therebetween, within which cavity a phase change material is located, and which is vaporised when solar radiation is incident on the outer vessel, in order to transfer heat to a water store contained in the inner vessel, this water store being fed fresh unheated water while the heated water is extracted therefrom for domestic or other purposes.

19 Claims, 6 Drawing Sheets

SOLAR WATER HEATER

CROSS-REFERENCE TO RELATED APPLICATIONS

This application is a U.S. National Stage application of International Application No. PCT/EP2009/007961, entitled A SOLAR WATER HEATER, filed Nov. 6, 2009, which claims priority to GB 0820369.7 filed Nov. 7, 2008, each of which is hereby incorporated by reference into the present application.

FIELD OF THE INVENTION

The present invention is concerned with a solar water heater, and in particular a solar water heated which is intended to be retrofitted to an existing domestic hot water supply system or the like, in order to reduce the energy requirements of such a system.

BACKGROUND OF THE INVENTION

Conventional solar water heating systems generally consists of a separate solar collector and water store, with pipes connecting the collector(s) to and from store(s). These systems can be either active or passive, with the active systems using an electric pump, and the passive systems relying on buoyancy forces in the form of thermosiphonic action. The collector can be anything from a simple flat plate arrangement, requiring freeze protection, to the more costly evacuated (heat pipe) tube system. The collector is generally connected indirectly to the existing hot water installation and as such requires a twin coil hot water cylinder.

While solar water heating systems are very effective in some environments, in a large number of countries or regions of the world, a combination of low average daily insolation (incident solar radiation) levels and the need for freeze protection measures render commercially available domestic solar water heating systems unsuitable or prohibitively expensive.

In its simplest form the integrated collector storage solar water heater (ICSSWH) is a water tank painted black to absorb insolation. In the past variations consisted of one or more tanks, painted black or coated with a selective absorbing surface, within a well insulated box, possibly with reflectors and covered with single, double or even triple layers of glass, plastic or a combination of the two. Due to its simplicity, an integrated collector/storage system is easier to construct and install which reduces maintenance and capital costs. In most climates, the large thermal mass of the store provides inherent resistance to freezing. However the integrated unit has a significant problem due to its unique mode of operation.

The earliest systems suffered substantially from heat losses to ambient, especially at night-time and non-collection periods. This meant no matter how effective the unit was in collecting solar energy, unless the hot water was fully withdrawn at the end of the collection period, losses to ambient led to only luke warm water being available early the next day. This reduced the overall solar fraction rendering it less viable economically. Indeed this deficiency in the late nineteenth century led to the prominence of thermosiphonic solar water heaters with diurnal heat storage to the detriment of the ICSSWH system. To overcome excessive heat loss and be in a position to compete with the more established distributed solar water heater systems, the ICSSWH design has had to evolve and incorporate new and novel methods of improving performance.

The present invention has been developed to provide an improved solar water heating apparatus.

SUMMARY OF THE INVENTION

The present invention therefore provides a solar water heating apparatus comprising inner and outer concentrically arranged vessels; a cavity defined between the vessels; a phase change material provided in the cavity; an inlet for delivering unheated water to the inner vessel; and an outlet for withdrawing heated water from the inner vessel.

Preferably, the cavity is partially evacuated.

Preferably, the apparatus comprises wicking material located in the cavity.

Preferably, the wicking material is provided on an inner face of the outer vessel.

Preferably, the wicking material is provided along a substantial portion of the length of the outer vessel.

Preferably, the apparatus comprises at least one reservoir within the cavity and within which reservoir at least a portion of the phase change material may be retained.

Preferably, the or each reservoir is defined by an annular collar seated against an inner face of the outer vessel.

Preferably, the apparatus comprises, for each reservoir, a corresponding annular cowl seated against the outer face of the inner vessel, at a position adjacent the respective reservoir and without being in direct contact with the reservoir.

Preferably, the cowl is arranged and dimensioned to direct condensed phase change material from an outer face of the inner vessel into the respective reservoir.

Preferably, the apparatus comprises a lower reservoir and an upper reservoir.

Preferably, the apparatus comprises an evacuated compartment disposed within the inner vessel and defining at least one of the reservoirs between the compartment and an inner face of the outer vessel.

Preferably, the inlet feeds into a lower portion of the inner vessel and the outlet is supplied from an upper portion of the inner vessel.

Preferably, the outlet returns through the inner vessel before exiting the outer vessel.

Preferably, the inlet and the outlet each extend through the outer vessel at a lower end thereof.

Preferably, the apparatus comprises a heat exchanger connected between the inlet and the outlet.

Preferably, the heat exchanger comprises a convoluted length of pipe.

Preferably, the length of pipe defines a spiral path having a progressively concentrated spiral as the pipe extends from the inlet towards the outlet.

Preferably, the apparatus comprises expansion means to enable the water in the inner vessel to expand as it is heated.

Preferably, a solar radiation absorbent coating is provided on an outer face of the outer vessel.

Preferably, the apparatus comprises a divider disposed within the outer vessel between an upper end of the inner vessel and an upper end of the outer vessel in order to reduce vapour heat transfer losses through the upper end of the outer vessel.

Preferably, the apparatus comprises a transparent cover vessel located concentrically about the outer vessel.

Preferably, the inlet and the outlet extend through the cover vessel at or adjacent an upper end thereof.

Preferably, the inlet and outlet are provided with thermal insulation between the outer vessel and the cover vessel.

Preferably, the space between the upper ends of the inner and outer vessels and the space between the lower ends of the inner and outer vessels are thermally insulated.

BRIEF DESCRIPTION OF THE DRAWINGS

The present invention will now be described with reference to the accompanying drawings, in which.

DETAILED DESCRIPTION OF THE DRAWINGS

Figure 1:
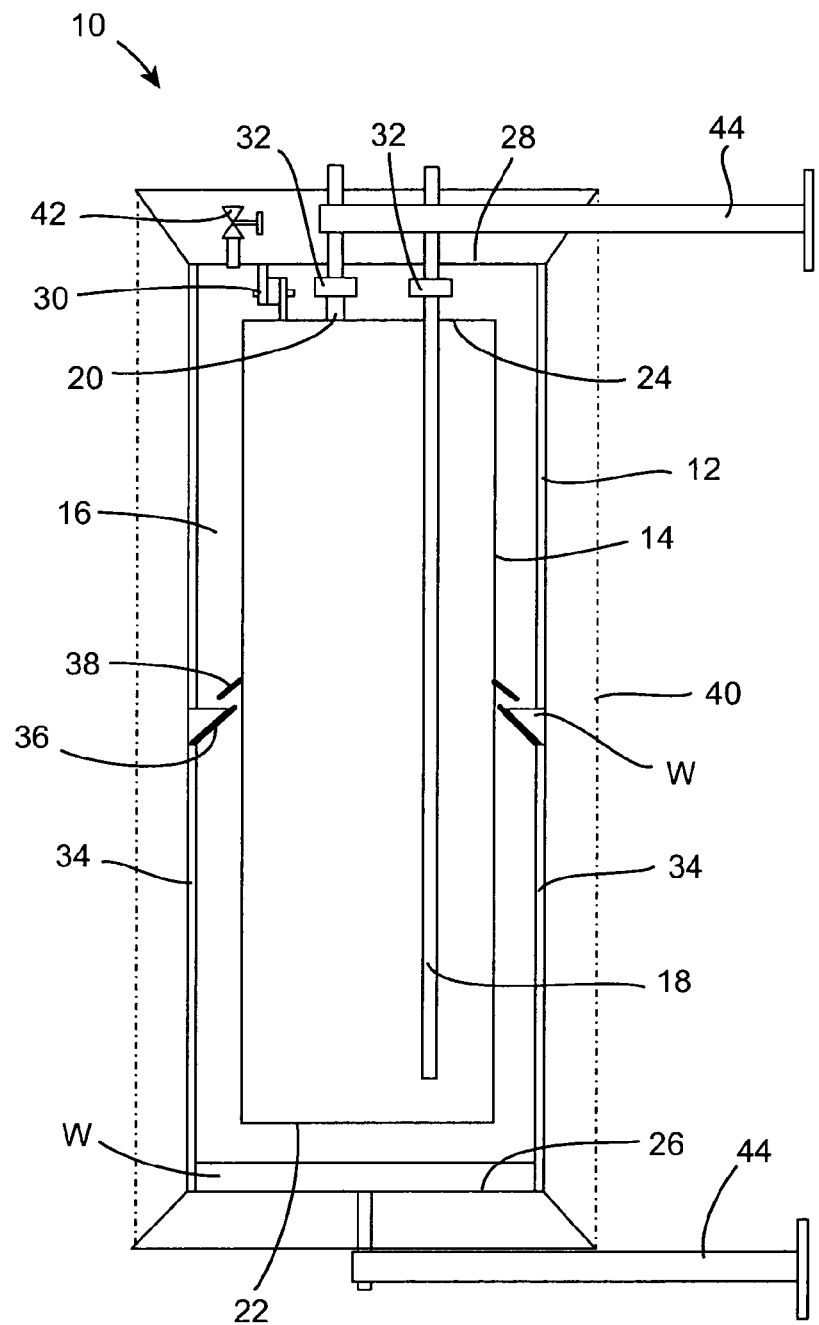
FIG. 1 illustrates a sectioned side view of a first embodiment of a solar water heating apparatus according to the present invention.
Figure 2:
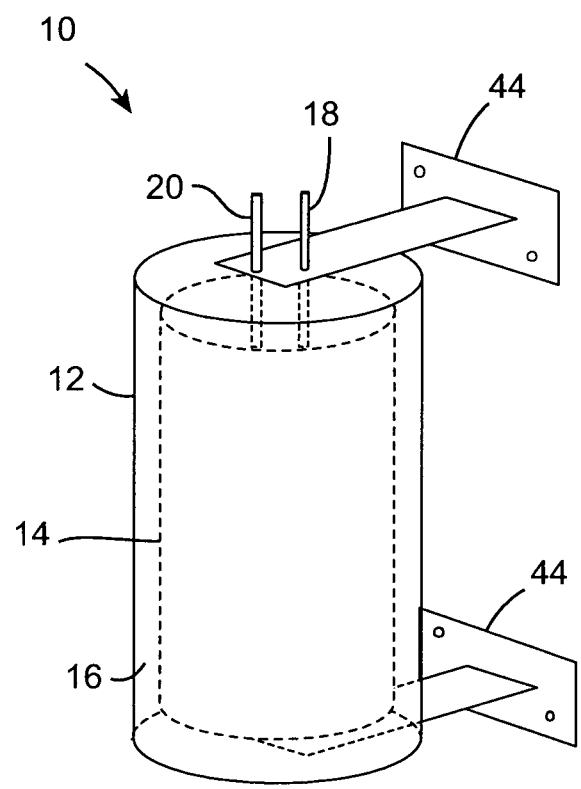
FIG. 2 illustrates a perspective view of the apparatus of FIG. 1.

Referring now to FIGS. 1 and 2 of the accompanying drawings, there is illustrated a first embodiment of a solar water heating apparatus, generally indicated as 10, which is adapted to effect the heating of water via solar radiation, and is particularly intended for use in the domestic market, to supplement hot water systems running on oil, gas or electricity.

The apparatus 10 comprises an outer vessel 12 which, in the embodiment illustrated, is cylindrical in form, and an inner vessel 14, again cylindrical in form in the preferred embodiment illustrated, which is housed concentrically within the outer vessel 12. The vessels 12, 14 need not be cylindrical in form, and may be of any other suitable shape.

There is thus an annular cavity 16 defined between the outer vessel 12 and the inner vessel 14. In use, this cavity 16 is partially evacuated and provided with a quantity of a phase change material, for example water or alcohol. In the preferred embodiment illustrated, the phase change material is provided as water W. The purpose of the water W will be described in detail hereinafter. Such a phase change material (PCM) is displaceable between liquid and vapour phases. It will however be appreciated that a PCM may be employed which moves between liquid and solid phases, such as for example wax. When using such a PCM the cavity 16 need not be partially evacuated and is preferably substantially filled with the PCM.

The apparatus 10 further comprises an inlet 18 which is in the form of a pipe extending from an exterior of the apparatus 10, through the outer and inner vessels 12, 14, to terminate adjacent an, in use, lower end 22 of the inner vessel 14. The apparatus 10 further comprises an outlet 20 in the form of a pipe which again extends from an exterior of the apparatus 10 through the outer and inner vessels 12, 14 and terminates adjacent an upper end 24 of the inner vessel 14.

The lower and upper ends 22, 24 of the inner vessel 14 are spaced from a corresponding lower end 26 and upper end 28 of the outer vessel 12, in order to avoid conductive heat transfer between the inner and outer vessels 14, 12. The inner vessel 14 is connected to the outer vessel 12 at the upper ends 24, 28 thereof via a coupling 30 which is thermally insulated, in order to prevent the conductive transfer of heat from the inner vessel 14 to the outer vessel 12, and from there to the surrounding environment. As both the inlet 18 and outlet 20 extend across the cavity 16 between the outer vessel 12 and inner vessel 14, a respective thermal break 32 is provided in each of the inlet 18 and outlet 20. This thermal break 32 again prevents the conductive transfer of heat along either the inlet 18 or outlet 20, between the inner vessel 14 and the outer vessel 12.

When the PCM is one which moves between a liquid and a vapour phase, such as water, the apparatus 10 is further provided with a capillary or wicking material 34, which is applied to the inner surface of the outer vessel 12, and preferably on the entire surface area thereof. The capillary material 34 serves to draw the phase change material, namely the water W, upwardly from the lower end 26 of the outer vessel 12, such as to effectively wet the entire inner surface of the outer vessel 12. In order to maximise this wetting of the inner surface of the outer vessel 12, the apparatus 10 comprises a reservoir in the form of a collar 36 disposed circumferentially on the inner surface of the outer vessel 12. This collar 36, in use, holds a reservoir of the water W at a position approximately half way up the cavity 16. The reservoir of water thus supplies the portion of capillary material 34 located above the collar 36. This therefore ensures that the capillary material 34 along the entire length of the outer vessel 12 will be supplied with the phase change material. Located directly above the collar 36, and concentrically about the inner vessel 14, is a corresponding shaped cowl 38 which serves to supply the collar 36, during use, with the phase change material, as will be described in greater detail hereinafter. It will be appreciated that more than one set of the collar 36 and cowl 38 could be provided along the length of the apparatus 10.

The apparatus 10 may also be provided with a protective transparent cover 40 which is again cylindrical in form and may be formed from clear glass or plastic or the like. A vacuum port 42 is also provided within the upper end 28 of the outer vessel 12, which is used to partially evacuate the cavity 16 during the manufacture of the apparatus 10 when a liquid/vapour PCM such as water is used.

Figure 6:
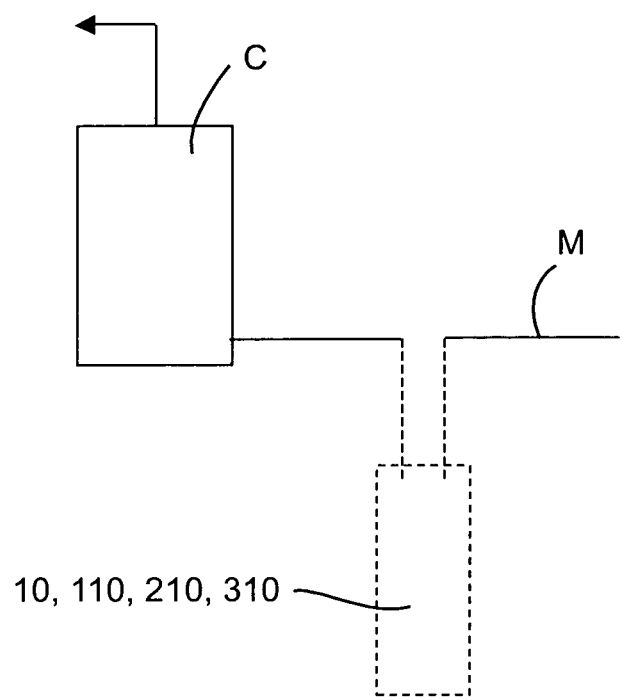
FIG. 6 illustrates a schematic representation of the installation of the solar water heating apparatus of the present invention.

In use the apparatus 10 is mounted at a location at which solar radiation will be incident thereon, for example an exterior wall of a home or the like. To this end the apparatus 10 is provided with a pair of brackets 44 which are used to mount the apparatus 10 to any such suitable location. The apparatus 10 is designed to function at its most efficient when positioned in a vertical orientation as illustrated. However, the apparatus will still function when positioned horizontally, or at an angle anywhere between horizontal and vertical. The apparatus 10, once mounted, is connected into the existing hot water system or circuit (not shown) of the building to which the apparatus 10 is mounted. In particular, the inlet 18 and outlet 20 are connected to cold water supply for the existing hot water system, such that the apparatus 10 is connected in series downstream of the, for example, hot water cylinder. FIG. 6 illustrates a schematic representation of one possible configuration for the installation of the apparatus 10 into a conventional domestic hot water supply, whereby the apparatus 10 is inserted, in line, between an existing hot water cylinder C and a mains supply of cold water M supplying the cylinder C. This ensures minimum disruption and avoids the need for a new twin coil hot water cylinder.

The inner vessel 14 is thus initially filled with cold water via the inlet 18. During daylight hours, when solar radiation is incident on the apparatus 10, the outer vessel 12 will be heated. In order to maximise this heating effect, the outer face of the outer vessel 12 may be provided with a solar radiation absorbent coating or the like. In addition, the outer vessel 14 is preferably formed from a thermally conductive material such as metal, for example copper. The PCM, for example water W, within the cavity 16 will have been drawn into the wicking material 34 by capillary action, and a substantial quantity of the water W is therefore in direct contact with the outer vessel 12. The heating of the outer vessel 12 will thus cause the water W contained by the wicking material 34 to boil. The temperature required to boil water within the cavity 16 is significantly lower than 100° C., due to the partial vacuum within the cavity 16. For example, if the pressure within the cavity is at 0.05 bar, the temperature required to boil water is approximately 32.9° C.

The steam created by boiling of the water W will therefore contact the inner vessel 14, resulting in latent heat transfer to the store of water within the inner vessel 14, thus slowly increasing the temperature thereof. The steam in direct contact with the inner vessel 14, having undergone latent heat transfer to the water within the inner vessel 14, will condense on the outer surface on the inner vessel 14, and drain downwardly under gravity.

Thus the condensate on the lower half of the inner vessel 14 will drain downwardly into the water reservoir at the lower end 26 of the outer vessel 12, in order to be re-supplied to the capillary material 34, thus beginning the cycle over again. Similarly, the condensate forming on the upper half of the inner vessel 14 will drain downwardly and hit the cowl 38, which will thus direct the condensate to drip downwardly into the reservoir defined by the collar 36. This reservoir of the water W thus re-supplies the capillary material 34 on the upper half of the outer vessel 12, in order to be re-supplied into the above described evaporation cycle. It will however be noted that the collar 36 does not contact the outer surface of the inner vessel 14, and thus the upper and lower sections of the cavity 14 are in fluid communication with one another, and thus steam generated in one section can circulate past the collar 36 to the other section.

If a solid/liquid PCM such as wax is employed, the cavity 16 need not be partially evacuated, and is preferably substantially filled with the PCM. During periods of daylight the incident solar radiation will cause the PCM to melt. The melted PCM promotes convective heat transfer to the colder inner vessel 14. During non-collection periods the PCM solidifies thus convective motion is removed and a greater level of insulation is achieved, thereby reducing heat loss from the inner vessel 14.

As the store of water within the inner vessel 14 is heated, the vertical orientation of the inner vessel 14 promotes stratification of the water. Thus warmer water will rise towards the top of the inner vessel 14 while the colder water will remain at the bottom, adjacent the inlet 18. It will therefore be appreciated that water drawn from the apparatus 10, and in particular the inner vessel 14, will be the warmest water in the inner vessel 14 as the outlet 20 terminates at the upper end 24 of the inner vessel 14. The full length inlet 18, extending to adjacent the lower end 22 of the inner vessel 14, minimises disruption to the above-mentioned thermal stratification within the inner vessel 14, as fresh cold water is supplied during use.

During periods of low or no solar radiation, for example at night, the partial vacuum within the cavity 16 maintains the temperature of the store of water within the inner vessel 14. This is due to the fact that during periods where no solar radiation is incident on the outer vessel 12, no evaporation of the phase change material within the cavity 16 takes place. Thus the heat loss between the inner vessel 14 and the outer vessel 12 is significantly reduced. The lower end 26 and upper end 28 of the outer vessel 12 also are preferably heavily thermally insulated, in order to further reduce heat loss from the apparatus 10. When a solid/liquid PCM such as wax is used, the solidified PCM, during periods where no solar radiation is incident on the outer vessel 12, substantially eliminates convective heat transfer from the inner vessel 14 to the outer vessel 12.

A further advantage of the apparatus arises from the relatively large volume of the inner vessel 14, which is preferably greater than 30 liters, and more preferably at least 50 liters in volume. The store of water contained within the inner vessel 14 will therefore have a significant thermal mass, protecting the apparatus 10 against freezing in reduced temperatures.

Figure 3:
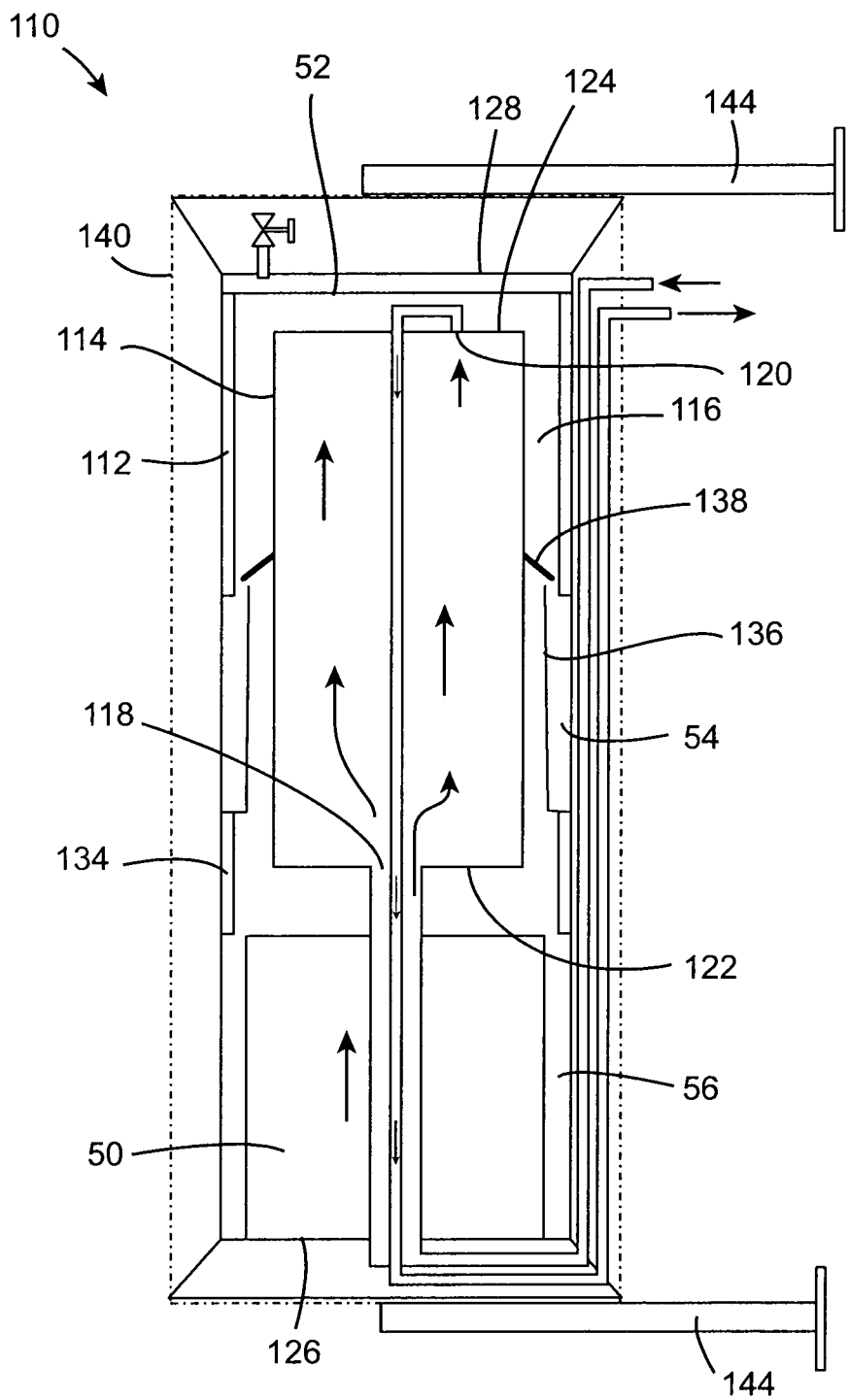
FIG. 3 illustrates a sectioned side view of a second embodiment of a solar water heating apparatus according to the present invention.

Turning then to FIG. 3 of the accompanying drawings there is illustrated a second embodiment of a solar water heating apparatus according to the present invention, generally indicated as 110. In this second embodiment like components have been accorded like reference numerals, and unless otherwise stated perform a like function.

The apparatus 110 comprises an outer vessel 112 and a concentrically disposed inner vessel 114, although in the second embodiment the lengthwise dimension of the inner vessel 114 relative to the outer vessel 112 is reduced, with the inner vessel 114 being disposed towards the mid to upper end of the outer vessel 112. This allows an additional evacuated chamber 50 to be located within the outer vessel 112 beneath the inner vessel 114, the reason for which will be described in detail hereinafter.

The apparatus 110 further comprises a cavity 116 defined between the outer and inner vessels 112, 114, and also extending downwardly therefrom and being further defined between the outer vessel 112 and the evacuated chamber 50. As with the apparatus 10 of the first embodiment, the cavity 116 is partially evacuated and provided with a quantity of a phase change material, for example water or alcohol, and preferably water W.

The apparatus 110 comprises an inlet 118 in the form of an elongated pipe, and a corresponding outlet 120, again in the form of an elongated pipe each of which are in fluid communication with the interior of the inner vessel 114. The inlet 118 feeds unheated water into the inner vessel 114 at a lower end 122 thereof, while the outlet 120, in the form of an elongated section of pipe, withdraws heated water from the inner vessel 114 at or adjacent an upper end 124 thereof. As with the previous embodiment the apparatus 110 is intended to be mounted in a vertical position, and thus during use stratification of the water within the inner vessel 114 occurs, with the hottest water rising to reside about the upper end 124, and the cooler water being disposed at the lower end 122, hence the positioning of the inlet 118 and outlet 120.

Unlike the previous embodiment however both the inlet 118 and outlet 120 exit the outer vessel 112 via a lower end 126 thereof, as opposed to an upper end 128 thereof. This involves reversing the outlet 120 and passing it back downwardly from the upper end 124 through the interior of the inner vessel 114, to exit the lower end 122 thereof before extend downwardly through the evacuated chamber 50 to exit the lower end 126 of the outer vessel 112. By avoiding routing the hot water outlet 120 through the upper end 128 of the outer vessel 112 it is possible to avoid or reduce conductive heat losses through the upper end 128 of the outer vessel 112.

From the lower end 122 of the inner vessel 114 to the lower end 126 of the outer vessel 112, the inlet 118 and outlet 120 are located concentrically with one another, although thermal insulation is provided between the two in order to prevent heat flow from the heated water passing through the outlet 120 to the unheated water passing through the inlet 118. The inlet 118 and outlet 120 also double as a structural support for the inner vessel 114, preferably via a non-conducting thermal break (not shown).

To further reduce thermal losses from the upper portion of the apparatus 110 a divider 52 is provided within the outer vessel 112 and located between the upper end 128 and the upper end 124 of the inner vessel 114. This divider 52 creates a buffer between the upper end 128 and the cavity 116 within which, as will be described hereinafter, vapour circulates to effect heat transfer between the outer vessel 112 and the inner vessel 114. By reducing the amount of moisture laden vapour in contact with the upper end 128, less latent heat is transferred to the exterior, and thus more is transferred to the inner vessel 114.

As with the first embodiment, the apparatus 110 is provided with wicking material 134 located along the inner face of the outer vessel 112, along essentially the entire length of the outer vessel 112. Located approximately half way along the length of the inner face of the outer vessel 114 is an annular collar 136 which thus defines a reservoir or pocket which is adapted to retain a portion of the water W at an intermediate location along the length of the outer vessel 112. Thus the cavity 116, for the purposes of the phase change material, is separated into two sections. The annular collar 36 thus defines an upper reservoir 54 for the phase change material, while the evacuated chamber 50 defines a lower reservoir 56. This separation reduces the action required by the wicking material 134, given the vertical height of the outer vessel 112, thus producing a greater wetted surface. In addition, by virtue of the smaller thermal capacity of the two reservoirs of the PCM, as opposed to one single reservoir having twice the capacity, the time period from liquid to vapour of the PCM is reduced, and the vaporisation process increased, thereby realising greater thermal transfer. As the chamber 50 is evacuated there is a reduction in the back thermal loss from the lower reservoir 56, thus improving vaporisation of the phase change material located therein. The evacuated chamber 50 may also be used to locate an intermediate, in line water store.

It will thus be appreciated that solar radiation incident on the outer vessel 112 will effect the vaporisation of the water W, which then condenses on the inner vessel 114, effecting the transfer of thermal energy thereto, and the condensed phase change material then trickles back down the outer face of the inner vessel 114 to be returned to the reservoirs 54, 56. In order to allow the lower or upper reservoir 54 to be continually re-supplied with this condensed phase change material, a cowl 138 is provided on the outer face of the inner vessel 114 directly above the collar 136. This cowl 138 directs the condensed phase change material trickling down the upper portion of the inner vessel 14 outwardly to drip into the upper reservoir 54. There is no contact between the collar 136 and the cowl 138, in order to prevent the conductive transfer of heat from the inner vessel 114 to the outer vessel 112. Once the phase change material is returned to both the upper reservoir 54 and the lower reservoir 56, the wicking material 134 draws it upwardly along the length of the wall of the outer vessel 112, to be re-vaporised by solar radiation incident on the apparatus 110. This cycle is repeated continuously in order to heat the water (or other liquid) within the inner vessel 114.

To further reduce thermal losses from the apparatus 110 the inlet 118 and outlet 120 are routed along the exterior of the lower end 126, up along the length of exterior of the outer vessel 112, before exiting through a protective transparent cover 140, which is again cylindrical in form and may be formed from clear glass or plastic or the like. Along this path thermal insulation is provided to surround the inlet 118 and the outlet 120 pipes. This thermal insulation is also provided between the lower end 126 of the outer vessel 112 and the cover 140 and the upper end 128 and the cover 140.

Figure 4:
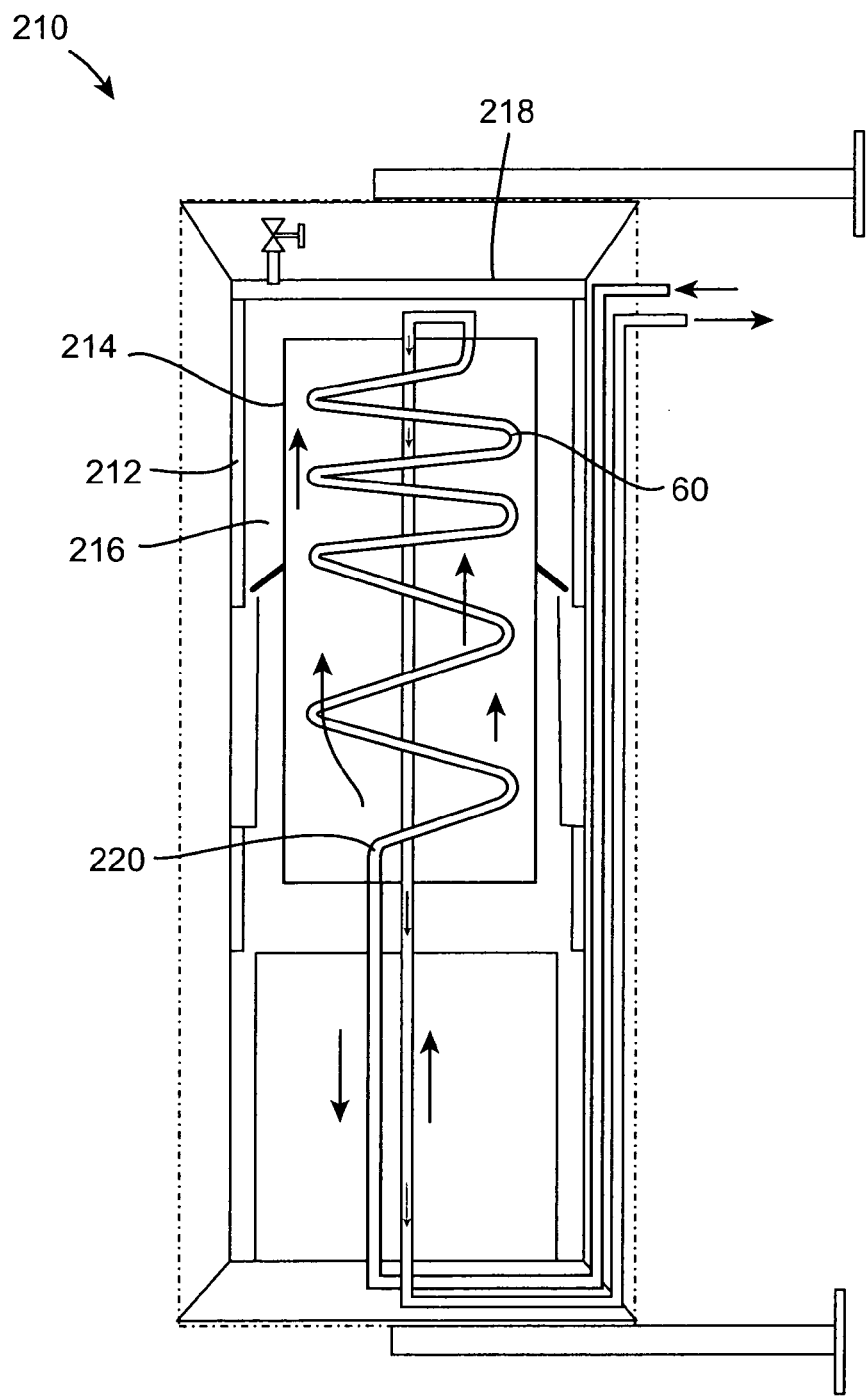
FIG. 4 illustrates a sectioned side view of a third embodiment of a solar water heating apparatus according to the present invention.

Turing then to FIG. 4 there is illustrate a third embodiment of a solar water heating apparatus according to the present invention, generally indicated as 210. Again in this third embodiment like components have been accorded like reference numerals, and unless otherwise stated perform a like function.

The configuration of the apparatus 210 is essentially identical to the configuration of the apparatus 110 and the second embodiment, having an outer vessel 212 and a concentrically mounted inner vessel 214 for housing a store of water or other liquid, a cavity 216 being defined between the two. However the configuration differs from the apparatus 110 in the provision of a heat exchanger 60 which is located on the interior of the inner vessel 214, providing a closed path between an inlet 218 and an outlet 220 of the apparatus 210. In this way the apparatus 210 provides an indirect means of heating the water entering the apparatus 210 by the inlet 218, in that the water in the inner vessel 214 is not in direct contact with the water system which feeds the apparatus 210.

The heat exchanger 60 is preferably in the form of a convoluted length of pipe, which is preferably spiral in shape, and is progressively more tightly would at the top of the inner vessel 214. This enhances the surface area of the heat exchanger 60 located in the upper portion of the inner vessel 214, and thus this greater surface area of the heat exchanger 60 is presented at the upper stratified layers of the solar heated water, realising a higher output temperature. As the inner vessel 214 is now effectively sealed, a conventional mechanism or means for expansion (not shown) must be provided in order to ensure safe operation of the apparatus 210.

Figure 5:
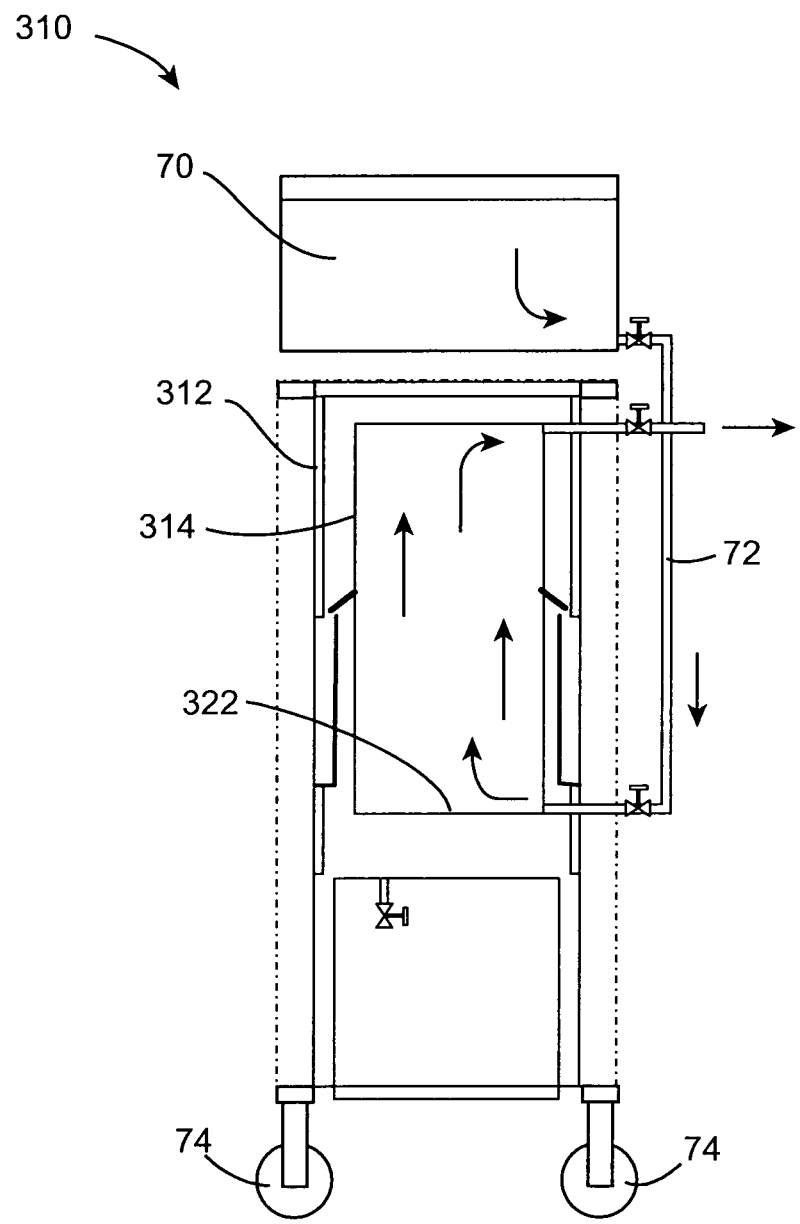
FIG. 5 illustrates a sectioned side view of a fourth embodiment of a solar water heating apparatus according to the present invention.

Referring now to FIG. 5 there is illustrated a fourth embodiment of a solar water heating apparatus according to the present invention, generally indicated as 310. In this fourth embodiment like components have been accorded like reference numerals and unless otherwise stated perform a like function.

The configuration of the apparatus 310 is similar to that of the apparatus 110 of the second embodiment, but includes a removable water reservoir 70 which is mounted above outer and inner vessels 312, 314 of the apparatus 310, and which supplies a lower end 322 of the inner vessel 314 via a temporary feed pipe 72 which is connected with an inlet 318 of the apparatus 310. The apparatus 310 further includes an outlet 320 extending from an upper end 324 of the inner vessel 314, from which heated water may be withdrawn from the inner vessel 314. The water fed into the inner vessel 314 from the reservoir 70 is heated in the same manner as described above with reference to the previous embodiments.

The apparatus 310 is also mounted on castors 74 or the like, in order to render the entire apparatus 310 portable. It will therefore be appreciated that the apparatus 310 may be wheeled to a desired location, and simply left in a free standing position in order to be exposed to solar radiation in order to heat the water contained within the inner vessel 314. As heated water is withdrawn from the inner vessel 314, water from the reservoir 70 is fed, preferably under gravity, through the feedpipe 72 to the inlet 318, in order to replenish the water within the inner vessel 314.

The apparatus 10; 110; 210; 310 of the present invention thus provides a simply yet effective means of heating a store of water via solar radiation, which can then be fed to the hot water cylinder of an existing hot water system, or used directly for any other purpose. This thus significantly reduces the energy required to heat the water to a level suitable for use in domestic or other applications.

The apparatus 10; 110; 210; 310 offers a simple preheating arrangement. The apparatus 10; 110; 210 will not produce as much hot water as a traditional system distributed solar water heater installation, but at a fraction of the cost, will be more cost effective, reducing the payback period to less than 5 years. The system also offers substantial benefits due to its installation requirements, opening the solar water heating installation to the DIY market. The apparatus 10; 110; 210; 310 is installed by mounting on an equator facing wall and connecting the inlet and outlet pipework into the cold feed for the existing hot water cylinder (HWC). This procedure avoids the costly need for a new twin coil HWC, pump, pipework and valves, freeze protection measures, controls and roof mounting assembly. In addition, the apparatus 10; 110; 210; 310 minimises damage to the building structure, with only a small plumbing procedure, two holes for inlet and outlet pipework through the roof sofit and two brackets for the mounting. Also, by opting for a wall fixture, the mounting locations for the apparatus 10; 110; 210; 310 are increased. The traditional solar water heater mounting on a sloped roof has only two mounting options, depending on the building orientation.

The invention claimed is:

1. The solar water heating apparatus comprising:
   inner and outer concentrically arranged vessels;
   a cavity defined between the vessels;
   a phase change material provided in the cavity,
      wherein the cavity is partially evacuated;
   an inlet for delivering unheated water to the inner vessel; and
   an outlet for withdrawing heated water from the inner vessel.

2. The solar water heating apparatus according to claim 1 in which the apparatus comprises wicking material located in the cavity.

3. The solar water heating apparatus according to claim 2 in which the wicking material is provided on an inner face of the outer vessel.

4. The solar water heating apparatus according to claim 2 in which the wicking material is provided along a substantial portion of the length of the outer vessel.

5. The solar water heating apparatus according to claim 1 comprising at least one reservoir within the cavity and within which reservoir at least a portion of the phase change material may be retained.

6. The solar water heating apparatus according to claim 5 in which each reservoir is defined by an annular collar seated against an inner face of the outer vessel.

7. The solar water heating apparatus according to claim 5 comprising, for each reservoir, a corresponding annular cowl seated against the outer face of the inner vessel, at a position adjacent to the respective reservoir and without being in direct contact with the reservoir, wherein the cowl is arranged and dimensioned to direct condensed phase change material from an outer face of the inner vessel in the respective reservoir.

8. The solar water heating apparatus according to claim 5 comprising a lower reservoir and an upper reservoir.

9. The solar water heating apparatus according to claim 5 comprising an evacuated compartment disposed within the inner vessel and defining at least one of the reservoirs between the compartment and an inner face of the outer vessel.

10. The solar water heating apparatus according to claim 1 in which the inlet feeds into a lower portion of the inner vessel and the outlet is supplied from an upper portion of the inner vessel.

11. The solar water heating apparatus according to claim 1 in which the outlet returns through the inner vessel before exiting the outer vessel.

12. The solar water heating apparatus according to claim 1 in which the inlet and the outlet each extend through the outer vessel at a lower end thereof.

13. The solar water heating apparatus according to claim 1 comprising a heat exchanger connected between the inlet and the outlet.

14. The solar water heating apparatus according to claim 13 in which the heat exchanger comprises a convoluted length of pipe, the length of pipe defines a spiral path having a progressively concentrated spiral as the pipe extends from the inlet towards the outlet.

15. The solar water heating apparatus according to claim 13 comprising expansion means to enable the water in the inner vessel to expand as it is heated.

16. The solar water heating apparatus according to claim 1 in which a solar radiation absorbent coating is provided on an outer face of the outer vessel.

17. The solar water heating apparatus according to claim 1 comprising a divider disposed within the outer vessel between an upper end of the inner vessel and an upper end of the outer vessel in order to reduce vapour heat transfer losses through the upper end of the outer vessel.

18. The solar water heating apparatus according to claim 1 comprising a transparent cover vessel located concentrically about the outer vessel.

19. The solar water heating apparatus according to claim 18 in which the inlet and the outlet extend through the cover vessel at or adjacent an upper end thereof, wherein the inlet and outlet are provided with thermal insulation between the outer vessel and the cover vessel.

* * * * *